US010044905B2

(12) United States Patent
Miyadera et al.

(10) Patent No.: US 10,044,905 B2
(45) Date of Patent: Aug. 7, 2018

(54) IMAGE PROCESSING APPARATUS, RECORDING MEDIUM, AND METHOD

(71) Applicants: Tatsuya Miyadera, Kanagawa (JP); Masahiko Oikawa, Kanagawa (JP)

(72) Inventors: Tatsuya Miyadera, Kanagawa (JP); Masahiko Oikawa, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 44 days.

(21) Appl. No.: 15/378,245

(22) Filed: Dec. 14, 2016

(65) Prior Publication Data

US 2017/0180604 A1 Jun. 22, 2017

(30) Foreign Application Priority Data

Dec. 17, 2015 (JP) ................................ 2015-246414

(51) Int. Cl.
*H04N 1/407* (2006.01)
*H04N 1/409* (2006.01)
*H04N 1/405* (2006.01)

(52) U.S. Cl.
CPC ......... *H04N 1/4078* (2013.01); *H04N 1/4056* (2013.01); *H04N 1/4092* (2013.01)

(58) Field of Classification Search
CPC ... H04N 1/4078; H04N 1/4056; H04N 1/4092
See application file for complete search history.

(56) References Cited

U.S. PATENT DOCUMENTS 6,934,057 B1 8/2005 Namizuka
7,715,769 B2 5/2010 Miyadera
8,170,455 B2 5/2012 Miyadera
8,194,266 B2 6/2012 Miyadera et al.
8,294,744 B2 10/2012 Kinoshita et al.
8,395,648 B2 3/2013 Miyadera et al.
8,411,124 B2 4/2013 Kinoshita et al.
8,482,588 B2 7/2013 Miyadera et al.
8,487,973 B2 7/2013 Kinoshita et al.
8,547,409 B2 10/2013 Yokoyama et al.
8,576,267 B2 11/2013 Kawanabe et al.
(Continued)

FOREIGN PATENT DOCUMENTS

JP 2007-215214 8/2007
JP 2007-228611 9/2007
JP 2009-188475 8/2009

*Primary Examiner* — Christopher D Wait
(74) *Attorney, Agent, or Firm* — Harness, Dickey & Pierce, P.L.C.

(57) ABSTRACT

An disclosed image processing apparatus reproduces an input pixel expressed by a gray level through a printing process performed on a plurality of segmented regions of the input pixel, based on an output pattern. The image processing apparatus includes: a duplicator configured to duplicate the input pixel into at least two pixels; a storage configured to store a plurality of tables, each of the plurality of tables associating the gray level and an output pattern of one of the duplicated pixels, such that a plurality of output patterns exist with respect to each gray level; and a controller configured to control a plurality of output regions, based on the output pattern corresponding to the gray level of the input pixel in accordance with a table selected for each of the duplicated pixels, the plurality of output regions corresponding to the plurality of segmented regions of each of the duplicated pixels.

8 Claims, 16 Drawing Sheets

(56) References Cited

U.S. PATENT DOCUMENTS

| | | | |
|---|---|---|---|
| 8,587,626 | B2 | 11/2013 | Komai et al. |
| 8,723,905 | B2 | 5/2014 | Kinoshita et al. |
| 8,817,320 | B2 | 8/2014 | Shirasaki et al. |
| 8,928,713 | B2 | 1/2015 | Miyadera et al. |
| 9,223,244 | B2 | 12/2015 | Murota et al. |
| 9,310,710 | B2 | 4/2016 | Suzuki et al. |
| 9,411,286 | B2 | 8/2016 | Miyadera |
| 2016/0018774 | A1 | 1/2016 | Abe et al. |

GRAY LEVEL 8

GRAY LEVEL 10

GRAY LEVEL 5

GRAY LEVEL 2

GRAY LEVEL 11

| INPUT DATA | 1200 dpi (FRONT END) | 1200 dpi (REAR END) |
|---|---|---|
| 0 | gamma0_0 | gamma1_0 |
| 1 | gamma0_1 | gamma1_1 |
| 2 | gamma0_2 | gamma1_2 |
| 3 | gamma0_3 | gamma1_3 |
| 4 | gamma0_4 | gamma1_4 |
| 5 | gamma0_5 | gamma1_5 |
| 6 | gamma0_6 | gamma1_6 |
| 7 | gamma0_7 | gamma1_7 |
| 8 | gamma0_8 | gamma1_8 |
| 9 | gamma0_9 | gamma1_9 |
| 10 | gamma0_a | gamma1_a |
| 11 | gamma0_b | gamma1_b |
| 12 | gamma0_c | gamma1_c |
| 13 | gamma0_d | gamma1_d |
| 14 | gamma0_e | gamma1_e |
| 15 | gamma0_f | gamma1_f |

POSITION OF IMAGE

GRAY
LEVEL 10

GRAY
LEVEL 10

GRAY
LEVEL 13

GRAY
LEVEL 0

GRAY
LEVEL 11

| INPUT DATA | 1200 dpi | 1200 dpi |
|---|---|---|
| 0 | gamma0_0 | gamma1_0 |
| 1 | gamma0_1 | gamma1_1 |
| 2 | gamma0_2 | gamma1_2 |
| 3 | gamma0_3 | gamma1_3 |
| 4 | gamma0_4 | gamma1_4 |
| 5 | gamma0_5 | gamma1_5 |
| 6 | gamma0_6 | gamma1_6 |
| 7 | gamma0_7 | gamma1_7 |
| 8 | gamma0_8 | gamma1_8 |
| 9 | gamma0_9 | gamma1_9 |
| 10 | gamma0_a | gamma1_a |
| 11 | gamma0_b | gamma1_b |
| 12 | gamma0_c | gamma1_c |
| 13 | gamma0_d | gamma1_d |
| 14 | gamma0_e | gamma1_e |
| 15 | gamma0_f | gamma1_f |
| POSITION OF IMAGE | FRONT END | REAR END |

GRAY LEVEL 10

GRAY LEVEL 10

GRAY LEVEL 13

GRAY LEVEL 0

GRAY LEVEL 11

| INPUT DATA | 1200 dpi | | | | | | | | 1200 dpi | | | | | | |
|---|---|---|---|---|---|---|---|---|---|---|---|---|---|---|---|
| 0 | | | | gamma0_0 | | | | | | | gamma1_0 | | | | |
| 1 | | | | gamma0_1 | | | | | | | gamma1_1 | | | | |
| 2 | | | | gamma0_2 | | | | | | | gamma1_2 | | | | |
| 3 | | | | gamma0_3 | | | | | | | gamma1_3 | | | | |
| 4 | | | | gamma0_4 | | | | | | | gamma1_4 | | | | |
| 5 | | | | gamma0_5 | | | | | | | gamma1_5 | | | | |
| 6 | | | | gamma0_6 | | | | | | | gamma1_6 | | | | |
| 7 | | | | gamma0_7 | | | | | | | gamma1_7 | | | | |
| 8 | | | | gamma0_8 | | | | | | | gamma1_8 | | | | |
| 9 | | | | gamma0_9 | | | | | | | gamma1_9 | | | | |
| 10 | | | | gamma0_a | | | | | | | gamma1_a | | | | |
| 11 | | | | gamma0_b | | | | | | | gamma1_b | | | | |
| 12 | | | | gamma0_c | | | | | | | gamma1_c | | | | |
| 13 | | | | gamma0_d | | | | | | | gamma1_d | | | | |
| 14 | | | | gamma0_e | | | | | | | gamma1_e | | | | |
| 15 | | | | gamma0_f | | | | | | | gamma1_f | | | | |

POSITION OF IMAGE     FRONT END     REAR END

GRAY LEVEL 6

GRAY LEVEL 6

GRAY LEVEL 15

GRAY LEVEL 6

GRAY LEVEL 15

IMAGE PROCESSING APPARATUS, RECORDING MEDIUM, AND METHOD

CROSS-REFERENCE TO RELATED APPLICATIONS

The present application claims the benefit of priority under 35 U.S.C. § 119 of Japanese Patent Application No. 2015-246414, filed Dec. 17, 2015, the contents of which are incorporated herein by reference in their entirety.

BACKGROUND OF THE INVENTION

1. Field of the Invention

The present disclosure relates to image processing apparatuses, recording media, and method.

2. Description of the Related Art

With respect to image data with low resolution, whose color thickness, brightness, etc., are expressed in gradation, there is a technique of outputting an image from an image processing apparatus with high resolution, after executing a process of increasing pixel density along a main-scanning direction or a sub-scanning direction in accordance with the resolution of the image processing apparatus and executing a gradation process.

Such a technique is embodied by, for example, an image processing apparatus provided with a multi laser diode (LD). For example, the image processing apparatus receives image data with low resolution constituted by pixels whose color thickness, brightness, etc., are expressed in gradation of 16 levels (i.e. gray level). Then the image processing apparatus writes the pixels (hereinafter referred to as multivalued pixels) included in the image data on a memory, and then reads out the pixels from the memory multiple times, so as to duplicate the multivalued pixels. Then, the image processing apparatus executes an edge correction, a trimming process, etc., on the image data constituted by the duplicated multiple multivalued pixels.

Then, the image processing apparatus segments the multivalued pixels, for example, into more than a hundred smaller-sized regions. Then, the image processing apparatus determines, with respect to each of the segmented regions, whether to light with an LD (i.e. whether to be a lighted region or a non-lighted region) based on the gray level of the duplicated multivalued pixels, with reference to a look up table (LUT) corresponding to the multiple duplicated multivalued pixels. The image processing apparatus performs binary processing for outputting an image on a print sheet, outputting a predetermined color on the lighted regions and not outputting color on the non-lighted regions.

Furthermore, there is a technique of executing γ conversion, using a LUT regarding gray level data of an input image and using phase data of an output image, so as to control emission of an LD (for example, see Japanese Unexamined Patent Application Publication No. 2007-215214).

RELATED ART DOCUMENTS

Patent Document 1: Japanese Unexamined Patent Application Publication No. 2007-215214

Patent Document 2: Japanese Unexamined Patent Application Publication No. 2007-228611

SUMMARY OF THE INVENTION

One aspect of the present invention provides an image processing apparatus which reproduces an input pixel included in image data, the input pixel being expressed by use of a gray level, through a printing process performed on a plurality of segmented regions of the input pixel, based on a predetermined output pattern. The image processing apparatus includes: a duplicator configured to duplicate the input pixel into at least two pixels; a storage configured to store a plurality of tables, each of the plurality of tables associating the gray level of the input pixel and an output pattern of one of the duplicated pixels, such that a plurality of output patterns belonging to the respective tables exist with respect to each gray level; and a controller configured to control a plurality of output regions of the printing process, based on the output pattern corresponding to the gray level of the input pixel in accordance with a table selected for each of the duplicated pixels out of the plurality of tables, the plurality of output regions corresponding to the plurality of segmented regions of each of the duplicated pixels.

DESCRIPTION OF THE EMBODIMENTS

There has been a problem regarding such conventional techniques that an accurate tone adjustment is difficult to achieve due to a limited number of light patterns for each of the pixels obtained through the process of increasing pixel density.

For example, in a case where an area formed by non-lighted regions placed between lighted regions of a duplicated pixel and lighted regions of another pixel which is adjacent to the duplicated pixel is narrow, as the lighted regions of the duplicated pixel and the lighted regions of the other pixel are close to each other, an undesired latent image may be formed due to exposure of a photoconductor on the non-lighted regions, which is caused by light from the lighted regions.

The image processing apparatus is not capable of determining lighted regions separately with respect to each of the duplicated pixels, as the image processing apparatus generates two duplicated pixels from a multivalued pixel and applies one LUT to both of the duplicated pixels. In such a background, there has been a problem that accuracy of gradation expression of an image output on a print sheet may be degraded, as formation of an undesired latent image due to exposure of the photoconductor on the non-lighted regions may not be prevented.

Therefore, the object of the disclosed technic is to improve accuracy of gradation expression of an output image.

Accuracy of gradation expression of an output image may be improved.

In the following, an embodiment of the present invention will be described with reference to accompanying drawings. Here, in the description and the drawings, constituent elements having substantially the same functional configurations will be assigned the same reference signs so that duplicated explanations will be omitted.

First Embodiment

Figure 1:
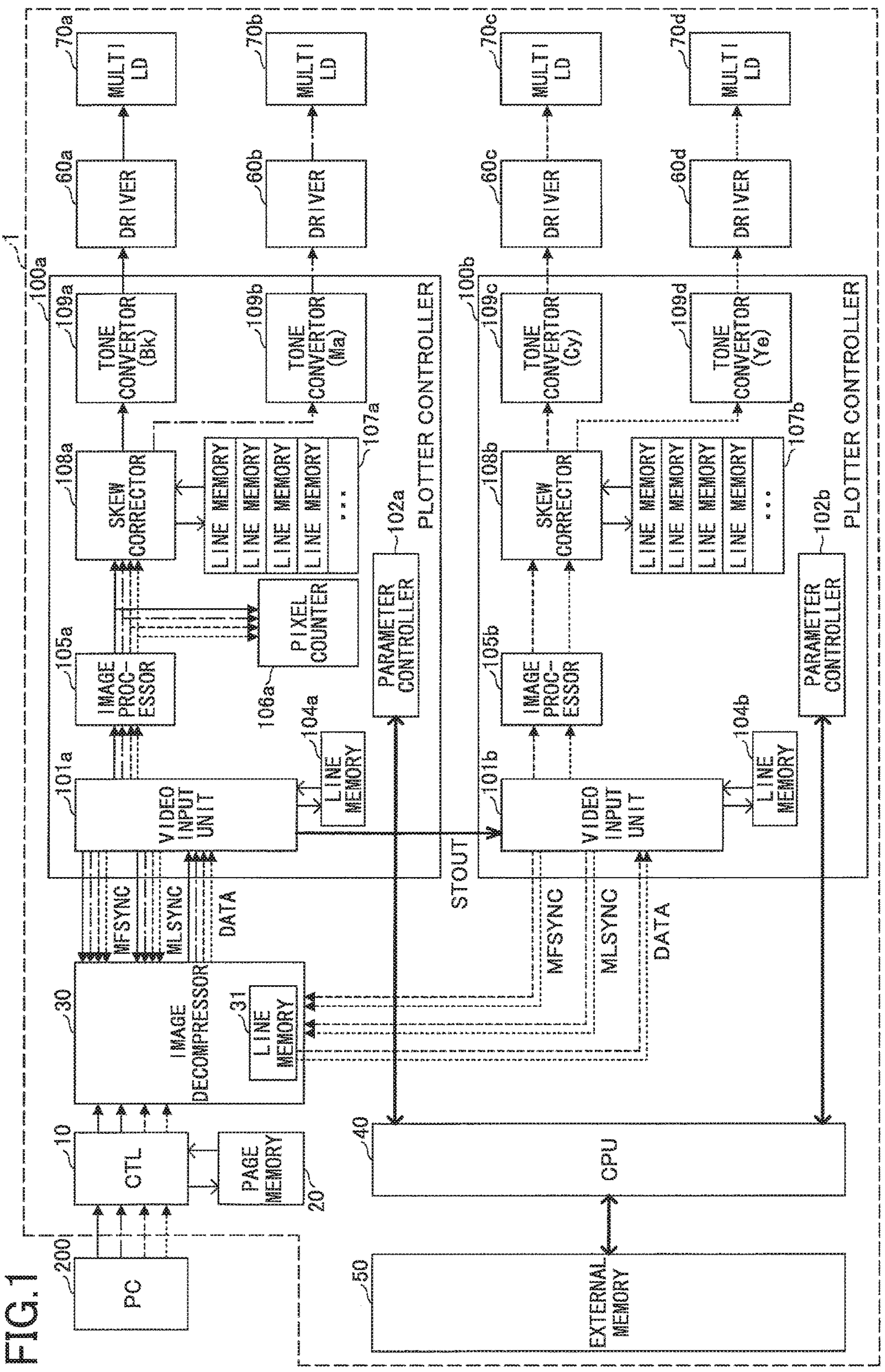
FIG. 1 is a drawing illustrating an example of a configuration of a writing data transferring system, according to an embodiment of the present invention.

FIG. 1 is a drawing illustrating an example of a configuration of a writing data transferring system 1. The writing data transferring system 1 includes a controller (CLT) 10, a page memory 20, an image decompressor 30, a line memory 31, a central processing unit (CPU) 40, an external memory 50, drivers 60*a* through 60*d*, multi LDs 70*a* through 70*d*, and plotter controllers 100*a* and 100*b*.

The plotter controllers 100*a* and 100*b* are in a master-slave relationship, where the plotter controller 100*a* functions as a master and the plotter controller 100*b* functions as a slave. That is to say, the timing for the plotter controller 100*b* to receive image data is controlled, based on the timing for the plotter controller 100*a* to receive image data.

The plotter controller 100*a* includes a video input unit 101*a*, a parameter controller 102*a*, a line memory 104*a*, an image processor 105*a*, a pixel counter 106*a*, a line memory set 107*a*, a skew corrector 108*a*, and tone convertors 109*a* and 109*b*. The plotter controller 100*b* has a similar configuration as that of the plotter controller 100*a*.

Each of the multi LDs 70*a* through 70*d* consists of four LDs. In other words, the multi LDs 70*a* through 70*d* consist of 16 LDs in total. The LDs are controlled by the plotter controllers 100*a* and 100*b*, so as to enable a high-resolution and high-speed output.

A personal computer (PC) 200 transmits image data in such a format as GIF and JPEG to the CTL 10, using a printer driver. The CTL 10 converts the received image data into image data such as bitmap data, and then forwards the converted image data to the image decompressor 30. The image decompressor 30 stores received image data of each color in the line memory 31.

The image decompressor 30 intercommunicates with the video input units 101*a* and 101*b*, in order to forward the image data to the plotter controllers 100*a* and 100*b*. Specifically, responding to an MLSYN signal, which is output by the video input unit 101*a* on the master side after an output of an MFSYN signal, the image decompressor 30 retrieves a line of image data from the line memory 31 and forwards the retrieved line of image data to the plotter controller 100*a*. Similarly, responding to an MLSYN signal, which is output by the video input unit 101*b* on the slave side after an output of an MFSYN signal, the image decompressor 30 retrieves a line of image data from the line memory 31 and forwards the retrieved line of image data to the plotter controller 100*b*. Here, the MFSYN signal is a synchronization signal of a pulse indicative of a page front. Further, the MLSYN signal is a synchronization signal of a pulse indicative of a line front.

Further, at the timing of an output of an MLSYNC signal from the video input unit 101*a*, the image decompressor 30 forwards a line of image data of each color (i.e. black, magenta, cyan, and yellow) to the plotter controller 100*a* on the master side. On the other hand, at the timing of an output of an MLSYNC signal from the video input unit 101*b*, the image decompressor 30 forwards a line of image data of each color (i.e. cyan and yellow) to the plotter controller 100*b* on the slave side.

The CPU 40 generates a start trigger signal, in response to detection of completion of preparation for forming an image, referring to the external memory 50, and then transmits the start trigger signal to the parameter controllers 102*a* and 102*b*.

The parameter controller 102*a*, which is on the master side, generates a start trigger (STOUT), based on the start trigger signal received from the CPU 40.

Further, a function of the parameter controllers 102*a* and 102*b* is to store parameters for controlling functional units in a memory and to transmit the parameters to the respective functional units. Here, the CPU 40 may modify the parameters stored in the memory.

Responding to the start trigger (STOUT) generated by the parameter controller 102*a*, the video input unit 101*a* generates a start trigger (STOUT), by use of the start trigger (STOUT) as a start trigger signal.

The video input unit 101*a* generates a MFSYNC signal and a MLSYNC signal for each color (i.e. black, magenta, cyan, or yellow), responding to the generated start trigger (STOUT), and then transmits the MFSYNC signal and the MLSYNC signal to the image decompressor 30. Then, the video input unit 101*a* receives a line of image data of each color (i.e. black, magenta, cyan, and yellow) in order, in accordance with the timing of transmitting the MFSYNC signal and the MLSYNC signal.

Further, the video input unit 101*a* transmits the start trigger (STOUT) generated on the master side to the plotter controller 100*b* on the slave side.

On the other hand, the video input unit 101*b*, which is on the slave side, generates a start trigger (STOUT), by use of the start trigger (STOUT) received from the video input unit 101*a* on the master side as a start trigger signal. The video input unit 101*b* generates a MFSYNC signal and a MLSYNC signal for each color (i.e. cyan and yellow), responding to the generated start trigger (STOUT), and then transmits the MFSYNC signal and the MLSYNC signal to the image decompressor 30. Then, the video input unit 101*b* receives a line of image data of each color (i.e. cyan and yellow) in order, in accordance with the timing of transmitting the MFSYNC signal and the MLSYNC signal. In such a way, the writing data transferring system 1 controls the timings for transmitting image data to the master side and to the slave side.

The video input unit 101*a*, which is on the master side, writes the line of image data transmitted from the image decompressor 30 on the line memory 104*a*. Then, the video input unit 101*a* reads out pixel data stored in the line memory 104*a* on a pixel to pixel basis. Here, the video input unit 101*a* may execute processing of copying the read pixel data, so that a pixel included in the pixel data is duplicated into two pixels in a main-scanning direction. In the following description, the processing of copying pixel data, so that each pixel included in image data is duplicated in either a main-scanning direction or a sub-scanning direction, is referred to as double density processing.

The video input unit 101*a,* which is on the master side, operates based on the same operating clock as the image decompressor 30. On the other hand, the video input unit 101*b,* which is on the slave side, operates based on a clock different from the image decompressor 30. Therefore, the video input unit 101*b* stores the received image data in the line memory 104*b* first, and then writes the image data on the line memory 104*b,* based on an operating clock that the video input unit 101*a* provides, in consideration of influence of a timing error in data transmission between the master and the slave sides due to wire delay, etc. In such a way, emergence of a timing error at the time of writing data, which is output from the master side, on a memory on the slave side may be prevented. The timing of memory writing performed by the video input unit 101*b* may be thereby adjusted. Furthermore, the video input unit 101*b,* which is on the slave side, executes double density processing, similarly to the video input unit 101*a* on the master side.

Here, the video input unit 101*a* on the master side and the video input unit 101*b* on the slave side are provided with a reference clock generated by a crystal oscillator, although not illustrated in FIG. 1, and therefore the phase locked loop (PLL) oscillation frequency regarding the plotter controller 100*a* and the plotter controller 100*b* is the same. The CPU 40 sets the same value of frequency dividing ratio on the parameter controller 102*a* and the parameter controller 102*b,* so that the plotter controller 100*a* and the plotter controller 100*b* operate on operation clocks of the same frequency.

The image processor 105*a,* first of all, performs an edge correction (1) on a group of received pixels. Then, the image processor 105*a* performs processing of image data such as a trimming correction (2) and an internal pattern superimposition (3). The processing of image data will be described in the following.

In the edge correction (1), an edge of image data is detected and corrected to be smooth.

In the trimming correction (2), an unnecessary part of image data is deleted. For example, the image processor 105*a* performs the trimming correction (2) in the main-scanning direction, and then adjusts an end of trimmed area, so that the end of the trimmed area matches an end of a corresponding chip.

In the internal pattern superimposition (3), image data is superimposed with a pattern image such as a test pattern, a pattern for counterfeit prevention, and a pattern for adjustment. The pattern for adjustment may be a pattern for density adjustment, a pattern for color shift adjustment, a pattern for preventing blade deformation, etc. The image processor 105*a* generates each of the patterns in the same format as an output format of the multi LDs 70*a* through 70*d,* and then superimposes each of the patterns on image data, so as to generate optimized image data.

Furthermore, the image processor 105*a* may correct image data by use of a line memory, although not illustrated in FIG. 1, in a case of performing a jaggy correction. Further, the image processor 105*a* may perform image processing other than the processing as described.

The image processor 105*b,* which is on the slave side, performs similar image processing as the image processor 105*a* on the master side.

The image processor 105*a* writes image data, which is obtained through such image processing, on the line memory set 107*a* for a skew correction. In a case where a line memory in the line memory set 107*a* for a skew correction is capable of storing M bits in an address of the line memory, the image processor 105*a* writes image data of M pixels per an address. In such a way, image data may be stored in a minimum memory in the same data format as the output format.

The pixel counter 106*a* counts the number of pixels included in image data obtained through the image processing. For example, the CPU 40 may calculate a fee charged to a user, based on the number of pixels counted by the pixel counter 106*a.* Here, as long as the counting of the number of pixels is performed in the plotter controller 100*a,* the counting may not be performed in the plotter controller 100*b.*

With regard to image data stored in the line memory sets 107*a* and 107*b* for skew correction, the skew correctors 108*a* and 108*b* switch line memories to read out the image data from, in accordance with positions of the image data, for the purpose of a skew correction of the image data. Specifically, the skew correctors 108*a* and 108*b* specify an address of a line memory to read out the image data from next, in accordance with positions of the image data. Then, the skew correctors 108*a* and 108*b* read out the image data, whose size is M bits, stored in the address, using M memory read circuits. Then, the skew correctors 108*a* and 108*b* transfer the read image data, whose size is M bits, to the tone convertors 109*a* and 109*b* and the tone converters 109*c* and 109*d,* respectively.

The tone convertors 109*a* through 109*d* determine a light pattern of each pixel obtained through double density processing, referring to look up tables (LUT).

Comparison Between a Related Art and the Embodiment of the Present Invention

Figure 2B:
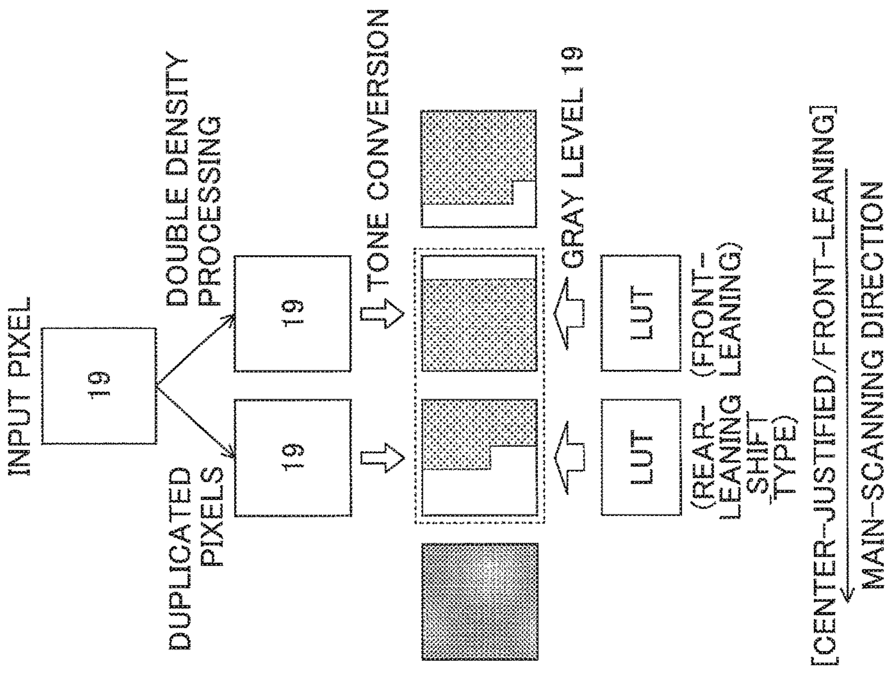
FIGS. 2A and 2B are drawings illustrating an example of processing performed by a tone convertor, according to the embodiment of the present invention.
Figure 2A:
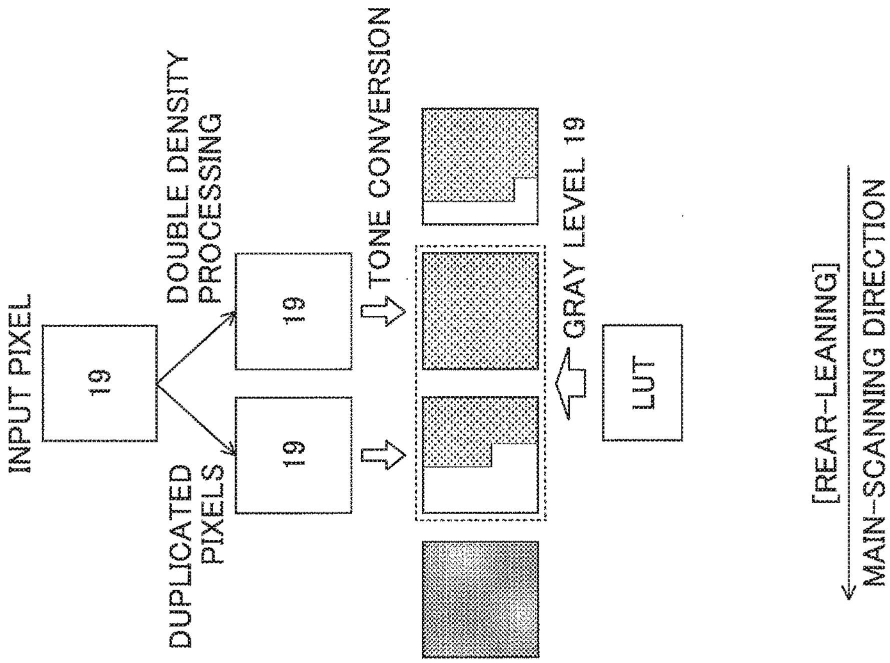

FIGS. 2A and 2B are drawings illustrating an example of processing performed by the tone convertor 109*a.* In FIG. 2A, tone conversion according to a related art is illustrated. An input pixel is illustrated on the upper part of FIGS. 2A and 2B. The number inside the squares is a gray level. In the examples illustrated in FIGS. 2A and 2B, the maximum gray level of the input pixel is "25", whereas the gray level of the pixel illustrated as an example in FIGS. 2A and 2B is "19". Pixels duplicated through the double density processing are illustrated on the middle parts of FIGS. 2A and 2B. The duplicated pixels include the same tone information as the input pixel. Output pixels are illustrated on the lower parts of FIGS. 2A and 2B, in which shaded parts are lighted regions.

According to the related art, two duplicated pixels, which are adjacent to each other along the main-scanning direction, are generated through the double density processing, based on the pixel having the gray level of "19". Then, the tone conversion is performed on each of the duplicated pixels having the gray level of "19", with reference to a single LUT indicating correspondence of gray levels of an input pixel and respective light patterns of two duplicated pixels. For example, the lighted regions corresponding to the two duplicated pixels as a whole are moved towards the rear side (in the main-scanning direction). Here, the sum of lighted regions corresponding to the two duplicated pixels is twice as many as the number of the lighted regions corresponding to the pixel having the gray level of "19".

In such a way, as the lighted regions corresponding to the two duplicated pixels are moved towards the rear side, a gap (i.e. non-lighted regions of the duplicated pixel on the left) between the lighted regions of the duplicated pixel on the left and the lighted regions of a pixel adjacent to the duplicated pixel on the left becomes wider. Thus, formation of an undesired latent image, which is caused by exposure of a photoconductor on the non-lighted regions of the duplicated pixel on the left, may be prevented.

On the other hand, an undesired latent image may be formed due to exposure of the photoconductor on the non-lighted regions of the pixel adjacent to the duplicated pixel on the right, which is caused by a narrow gap between the lighted regions of the duplicated pixel on the right and the lighted regions of a pixel adjacent to the duplicated pixel on the right. Thus, tone difference between the duplicated pixel on the right and the pixel adjacent to the duplicated pixel on the right may not be expressed correctly.

In other words, although the lighted regions corresponding to the duplicated pixels are moved towards the rear side to balance with the entirely lighted pixel which is adjacent to the duplicated pixel on the left, an undesired latent image may be formed due to exposure of the photoconductor on the non-lighted regions of the pixel adjacent to the duplicated pixel on the right, as the width of the non-lighted regions of the pixel adjacent to the duplicated pixel on the right becomes narrower.

On the other hand, tone conversion according to the embodiment of the present invention is illustrated in FIG. 2B. The video input unit 101*a* executes double density processing to duplicate a pixel having the gray level of "19" into two pixels adjacent to each other along the main-scanning direction. Then, the tone convertor 109*a* selects an LUT for each of the duplicated pixels out of multiple LUTs indicating correspondence of gray levels of an input pixel and respective light patterns of an output pixel. In other words, the tone convertor 109*a* utilizes different LUTs, one for the pixel on the right and the other for the pixel on the left. For example, the tone convertor 109*a* applies a rear-leaning LUT (shift type), with respect to the pixel on the left, whereas the tone convertor 109*a* applies a front-leaning LUT, with respect to the pixel on the right. Here, the light pattern illustrated in FIG. 2B corresponds to "center-justified/front-leaning" tone conversion, which will be described later. In such a way, exposure of the photoconductor on the non-lighted regions due to light from the lighted regions on both sides may be prevented as the gap between the lighted regions near the boundary of the duplicated pixel on the right and the adjacent pixel becomes wider. Therefore, an accurate tone expression may be performed, as formation of an undesired latent image due to exposure of the photoconductor on the non-lighted regions near the left side boundary of the duplicated pixel on the left and the right side boundary of the duplicated pixel on the right may be prevented.

[γ Conversion According to Related Art]

Figure 3A:
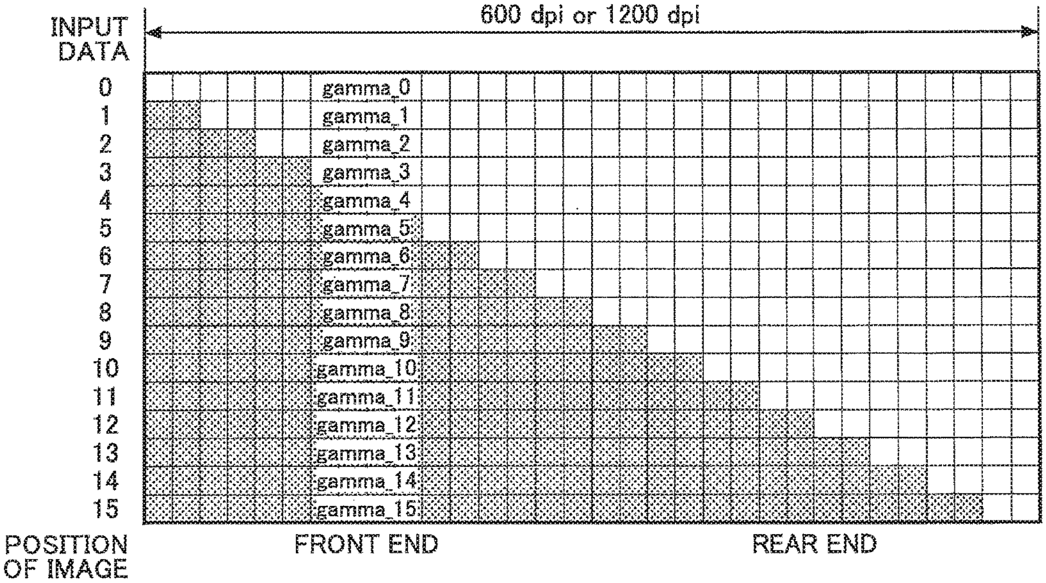
FIGS. 3A through 3C are a first set of drawings for explaining γ conversion using an LUT, according to the embodiment of the present invention.
Figure 3B:
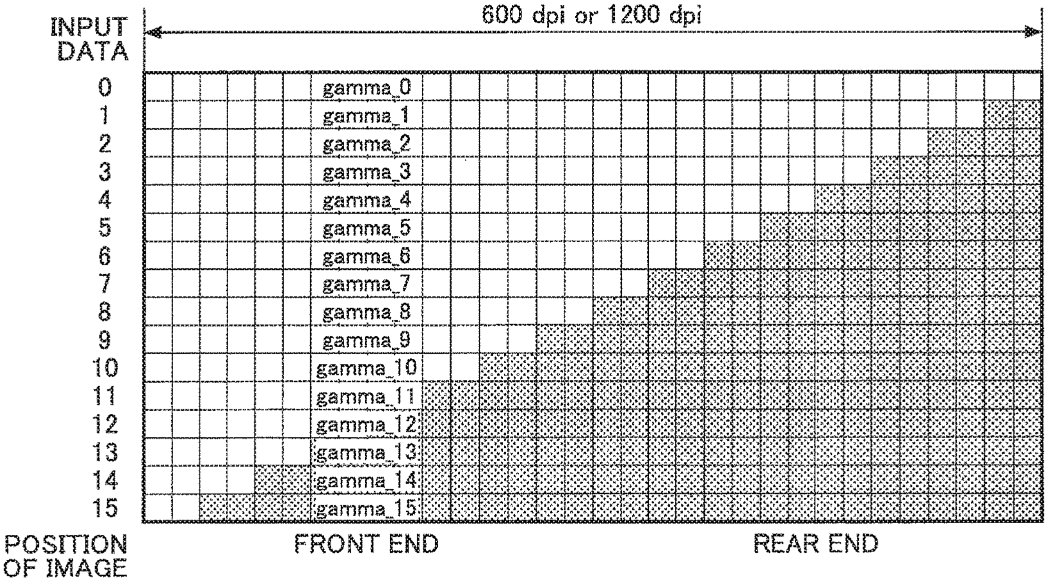
Figure 3C:
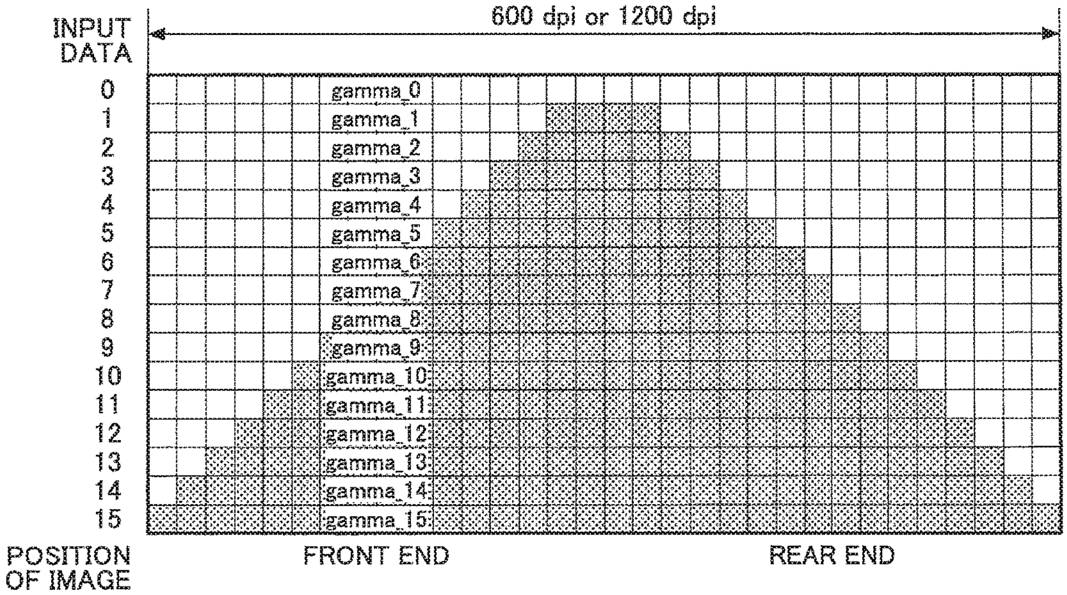

FIGS. 3A through 3C are a first set of drawings for explaining γ conversion using an LUT. The LUT stores light patterns of a pixel corresponding to respective gray levels of an input pixel. A memory provided in the tone convertor 109*a,* although not illustrated in FIG. 1, stores multiple LUTs that associate gray levels of an input pixel and respective light patterns of an output pixel. For example, with respect to gray levels of an input pixel, an LUT may indicate front-leaning light patterns, according to which lighted regions are on the front side of a pixel, rear-leaning light patterns, according to which lighted regions are on the rear side of a pixel, or center-justified light patterns, according to which lighted regions are on the central part of a pixel.

In the examples of FIGS. 3A through 3C, lighted regions of two duplicated pixels are determined, based on a single LUT.

FIG. 3A is a drawing illustrating an example of an LUT indicating front-leaning light patterns. The numbers of 0 through 15 vertically aligned on the left end of FIG. 3A are gray levels on an input pixel. Shaded squares indicate positions of lighted regions. In a case where shaded squares are on the left side area, it is indicated that lighted regions corresponding to two duplicated pixels are on the left side area (i.e. front side area in the main-scanning direction).

Further, in a case where shaded squares are on the right side area, it is indicated that lighted regions corresponding to two duplicated pixels are on the right side area (i.e. rear side area in the main-scanning direction).

Further, in a case where shaded squares are on the central part area, it is indicated that lighted regions corresponding to two duplicated pixels are on the central part area (i.e. middle part area in the main-scanning direction).

According to the LUT indicating the front-leaning patterns illustrated in the example of FIG. 3A, the number of lighted regions increases in order from the region on the left end, as the gray level becomes larger. For example, in a case where the gray level is less than a half of the maximum gray level, the number of lighted regions increases in order from the left end (i.e. the front end in the main-scanning direction) of the regions corresponding to the pixel on the left, as the gray level becomes larger. Further, in a case where the gray level is more than a half of the maximum gray level, the regions corresponding to the pixel on the left (hereinafter referred to as regions corresponding to the left) are entirely lighted, and the number of lighted regions increases in order from the left end of the regions corresponding to the pixel on the right (hereinafter referred to as regions corresponding to the right), as the gray level becomes larger.

According to the LUT indicating the rear-leaning patterns illustrated in the example of FIG. 3B, the number of lighted regions increases in order from the region on the right end, as the gray level becomes larger. For example, in a case where the gray level is less than a half of the maximum gray level, the number of lighted regions increases in order from the right end (i.e. the rear end in the main-scanning direction) of the regions corresponding to the right, as the gray level becomes larger. Further, in a case where the gray level is more than a half of the maximum gray level, the regions corresponding to the right are entirely lighted, and the number of lighted regions increases in order from the right end of the regions corresponding to the left, as the gray level becomes larger.

According to the LUT indicating the center-justified patterns illustrated in the example of FIG. 3C, the number of lighted regions increases in order from the region in the middle, as the gray level becomes larger.

Figure 4A:
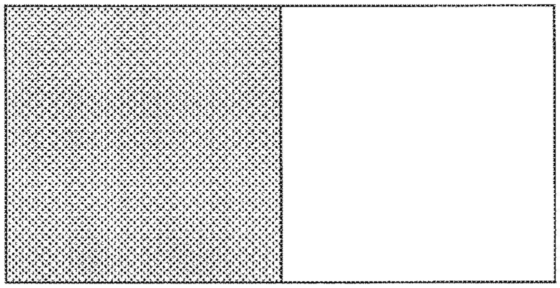
FIGS. 4A through 4E are drawings illustrating a first set of examples of lighted regions determined based on respective light patterns, according to the embodiment of the present invention.

FIGS. 4A through 4E are drawings illustrating a first set of examples of lighted regions determined based on the respective light patterns. In FIG. 4A, lighted regions according to the LUT indicating the front-leaning light patterns illustrated in FIG. 3A, in a case where the gray level of an input pixel is "8", are indicated. In the case where the gray level is "8", the entire regions corresponding to the duplicated pixel on the left are lighted, whereas the entire regions corresponding to the duplicated pixel on the right are non-lighted.

Figure 4B:
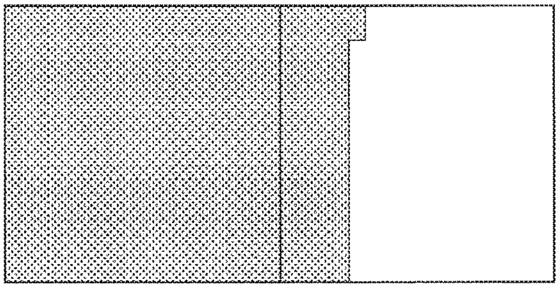

In FIG. 4B, lighted regions according to the LUT indicating the front-leaning light patterns illustrated in FIG. 3A, in the case where the gray level of the input pixel is "10", are indicated. In the case where the gray level is "10", the entire regions corresponding to the duplicated pixel on the left are lighted, whereas some of the regions from the left end, corresponding to the duplicated pixel on the right, are lighted.

Figure 4C:
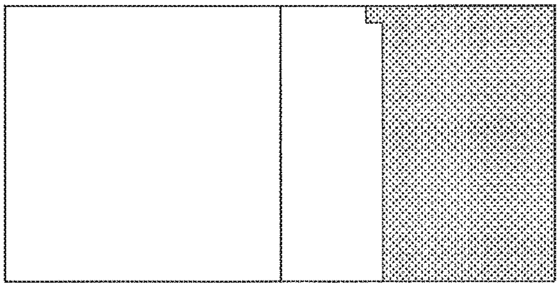

In FIG. 4C, lighted regions according to the LUT indicating the rear-leaning light patterns illustrated in FIG. 3B, in a case where the gray level of the input pixel is "5", are indicated. In the case where the gray level is "5", the entire regions corresponding to the duplicated pixel on the left are non-lighted, whereas most of the regions from the right end, corresponding to the duplicated pixel on the right, are lighted.

Figure 4D:
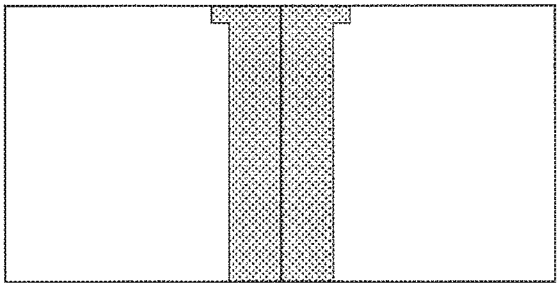

In FIG. 4D, lighted regions according to the LUT indicating the center-justified light patterns illustrated in FIG. 3C, in a case where the gray level of the input pixel is "2", are indicated. In the case where the gray level is "2", some of the regions from the right end, corresponding to the duplicated pixel on the left, are lighted, whereas some of the regions from the left end, corresponding to the duplicated pixel on the right, are lighted.

Figure 4E:
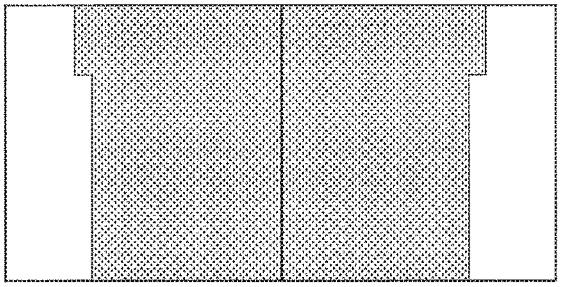

In FIG. 4E, lighted regions according to the LUT indicating the center-justified light patterns illustrated in FIG. 3C, in a case where the gray level of the input pixel is "11", are indicated. In the case where the gray level is "11", most of the regions from the right end, corresponding to the duplicated pixel on the left, are lighted, whereas most of the regions from the left end, corresponding to the duplicated pixel on the right, are lighted.

γ Conversion According to the First Embodiment of the Present Invention

Above is an explanation, with reference to the related art, regarding determination of a light pattern using the LUT indicating the front-leaning light patterns, the LUT indicating the rear-leaning light patterns, and the LUT indicating the center-justified light patterns.

Other than the light patterns as described above, the first embodiment of the present invention introduces LUTs indicating unique light patterns such as light-saving light patterns, according to which regions corresponding to only a part (e.g. one pixel) of the multiple duplicated pixels may be lighted, and inverse light patterns, according to which lighted regions and non-lighted regions are inverted so as to perform image processing for inverting light and dark of an image. The following light patterns are only examples. The tone convertor 109*a* may utilize other LUTs.

In the following, examples of γ conversion according to the first embodiment of the present invention will be described, with reference to FIGS. 5A through 10E.

Figure 5A:
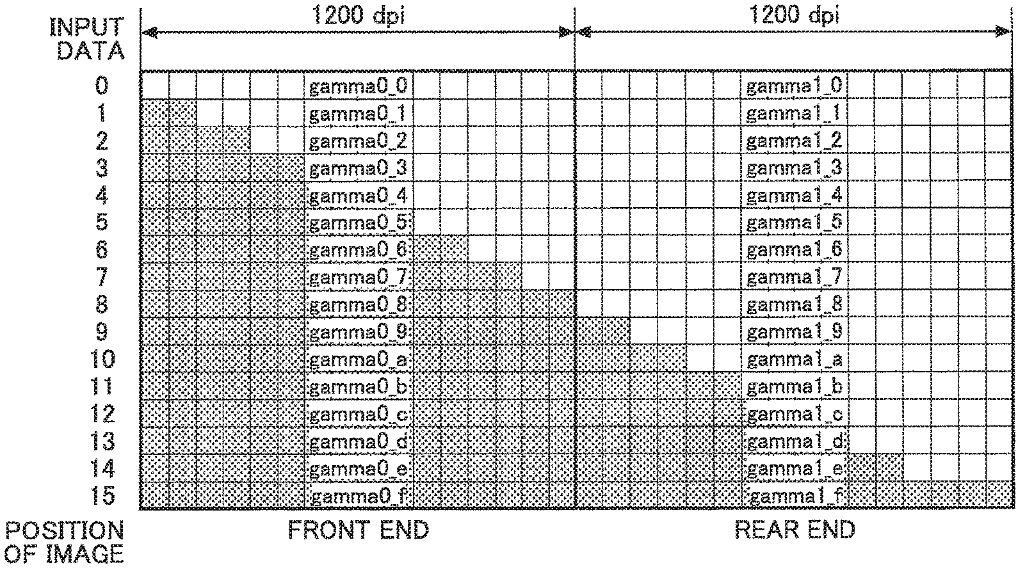
FIGS. 5A through 5C are a second set of drawings (front-leaning) for explaining γ conversion using LUTs, according to the embodiment of the present invention.
Figure 5B:
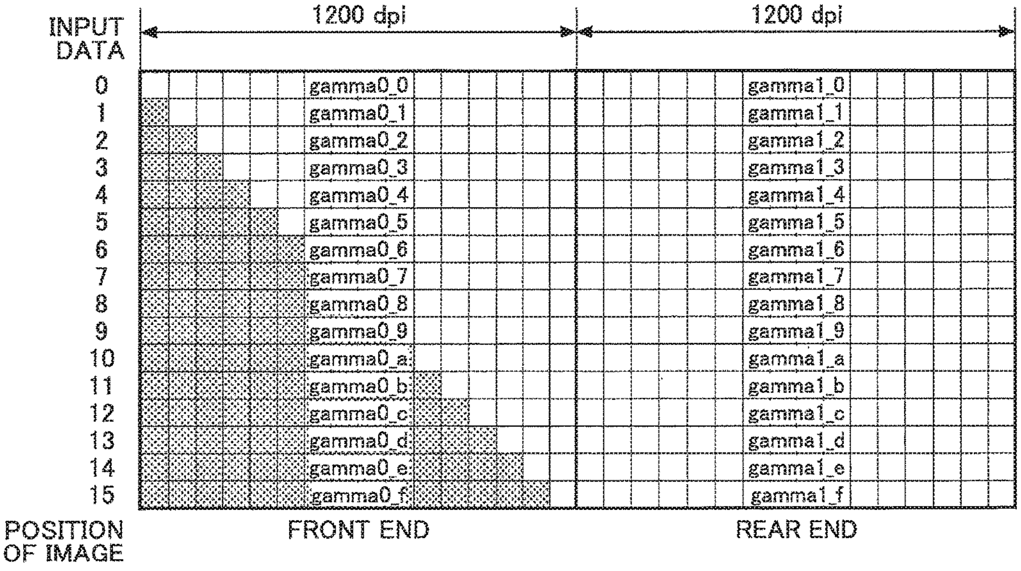
Figure 5C:
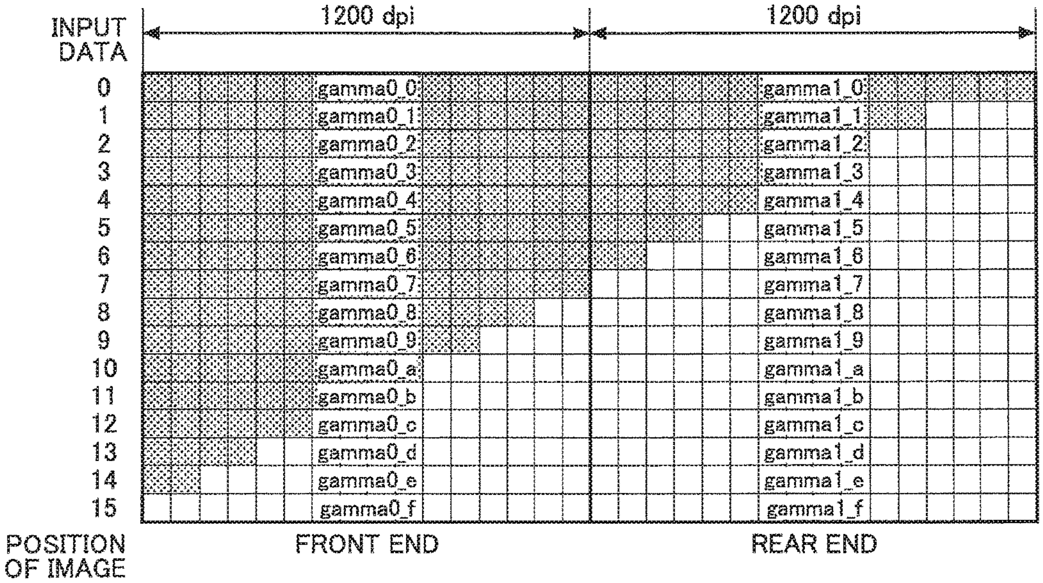

FIGS. 5A through 5C are a second set of drawings (front-leaning) for explaining γ conversion using LUTs. The tone convertor 109*a* determines light patterns corresponding to the two duplicated pixels, based on different LUTs, respectively.

According to LUTs indicating front-leaning light patterns illustrated in FIG. 5A, the number of lighted regions increases in order from the left end (i.e. front end in the main-scanning direction), as the gray level becomes larger.

According to LUTs indicating front-leaning/light-saving light patterns illustrated in FIG. 5B, the entire regions corresponding to the duplicated pixel on the right are non-lighted regions. On the other hand, regarding the regions corresponding to the duplicated pixel on the left, the number of lighted regions increases in order from the left end, as the gray level becomes larger. In such a way, reduction of an amount of toner, density adjustment, etc., may be possible, as the number of lighted regions is half the number of lighted regions illustrated in FIG. 5A.

Here, the writing data transferring system may utilize the LUTs indicating the front-leaning/light-saving light patterns, in response to a request from the PC 200 for saving toner, etc.

Furthermore, in the examples of FIGS. 5A through 5C, the lighted regions corresponding to the two duplicated pixels are determined based on different LUTs, respectively. Thus, lighted regions may be increased by two squares per an increase of one gray level as illustrated in FIG. 5A, and may be increased by one square per an increase of one gray level as illustrated in FIG. 5B. Therefore, an accurate tone expression may be performed.

According to the LUTs indicating the inverse light patterns as illustrated in FIG. 5C, the number of non-lighted regions increases in order from the right end, as the gray level becomes larger. In other words, the light patterns in the example of FIG. 5C is inverse with regard to the light and dark of the light patterns in the example of FIG. 5A, where the lighted regions according to the light patterns illustrated in FIG. 5A are non-lighted regions and the non-lighted regions according to the light patterns illustrated in FIG. 5A are lighted regions.

The tone convertor 109*a* may store a set of LUTs utilized for normal tone conversion (e.g. LUTs indicating the light patterns of FIG. 5A) and LUTs utilized for inverting light and dark in gradation (e.g. LUTs indicating the light patterns of FIG. 5C) in a memory, although not illustrated in FIG. 1. The tone convertor 109*a* may determine lighted regions based on the LUTs for inverting the light and dark, instead of the counterpart LUTs for a normal use, in response to an input of setting for inverting the light and dark in printing processing.

For example, in response to an input of setting by a user for inverting the light and dark in printing processing, the tone convertor 109*a* utilizes the LUTs illustrated in FIG. 5C, instead of the LUTs illustrated in FIG. 5A. Then, the tone convertor 109*a* determines lighted regions corresponding to the duplicated pixels, based on the LUTs illustrated in FIG. 5C.

Figure 6A:
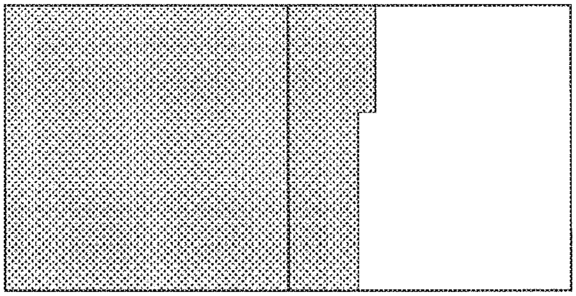
FIGS. 6A through 6E are drawings illustrating a second set of examples of lighted regions determined based on respective light patterns, according to the embodiment of the present invention.

FIGS. 6A through 6E are drawings illustrating a second set of examples of lighted regions determined based on the respective light patterns. In FIG. 6A, lighted regions according to the LUTs indicating the front-leaning light patterns illustrated in FIG. 5A, in a case where the gray level of an input pixel is "10", are indicated. In the case where the gray level is "10", the entire regions corresponding to the duplicated pixel on the left are lighted, whereas some of the regions from the left end, corresponding to the duplicated pixel on the right, are lighted.

Figure 6B:
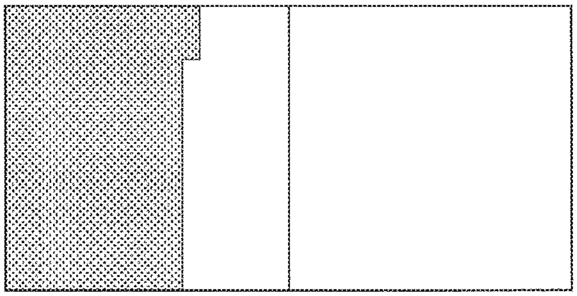

In FIG. 6B, lighted regions according to the LUTs indicating the front-leaning/light-saving light patterns illustrated in FIG. 5B, in a case where the gray level of the input pixel is "10", are indicated. In the case where the gray level is "10", more than a left half of the regions corresponding to the duplicated pixel on the left are lighted, whereas the entire regions corresponding to the duplicated pixel on the right are non-lighted.

Figure 6C:
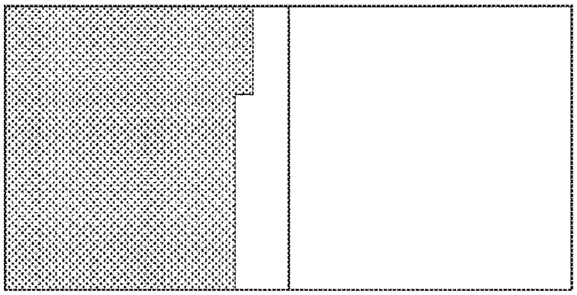

In FIG. 6C, lighted regions according to the LUTs indicating the front-leaning/light-saving light patterns illustrated in FIG. 5B, in a case where the gray level of the input pixel is "13", are indicated. In the case where the gray level is "13", most of the regions from the left end (a larger number of regions than the regions in FIG. 6B), corresponding to the duplicated pixel on the left, are lighted, whereas the entire regions corresponding to the duplicated pixel on the right are non-lighted.

Figure 6D:
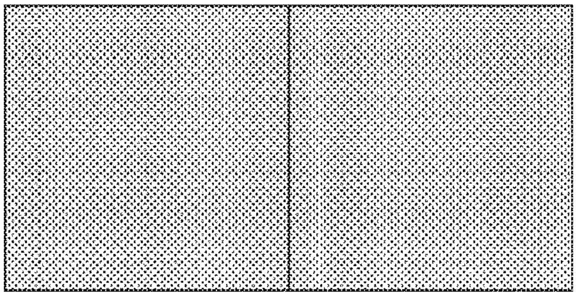

In FIG. 6D, lighted regions according to the LUTs indicating the inverse light patterns illustrated in FIG. 5C, in a case where the gray level of the input pixel is "0", are indicated. In the case where the gray level is "0", the entire regions corresponding to the duplicated pixel on the left and on the right are lighted.

Figure 6E:
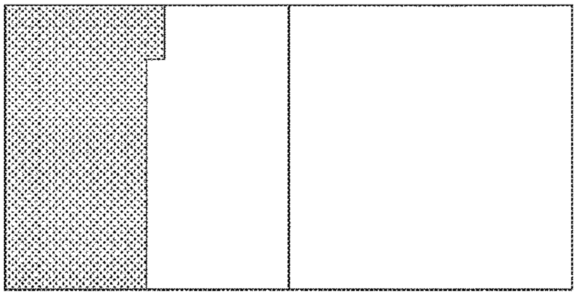

In FIG. 6E, lighted regions according to the LUTs indicating the inverse light patterns illustrated in FIG. 5C, in a case where the gray level of the input pixel is "11", are indicated. In the case where the gray level is "11", an almost left half of the regions corresponding to the duplicated pixel on the left are lighted, whereas the entire regions corresponding to the duplicated pixel on the right are non-lighted.

Figure 7A:
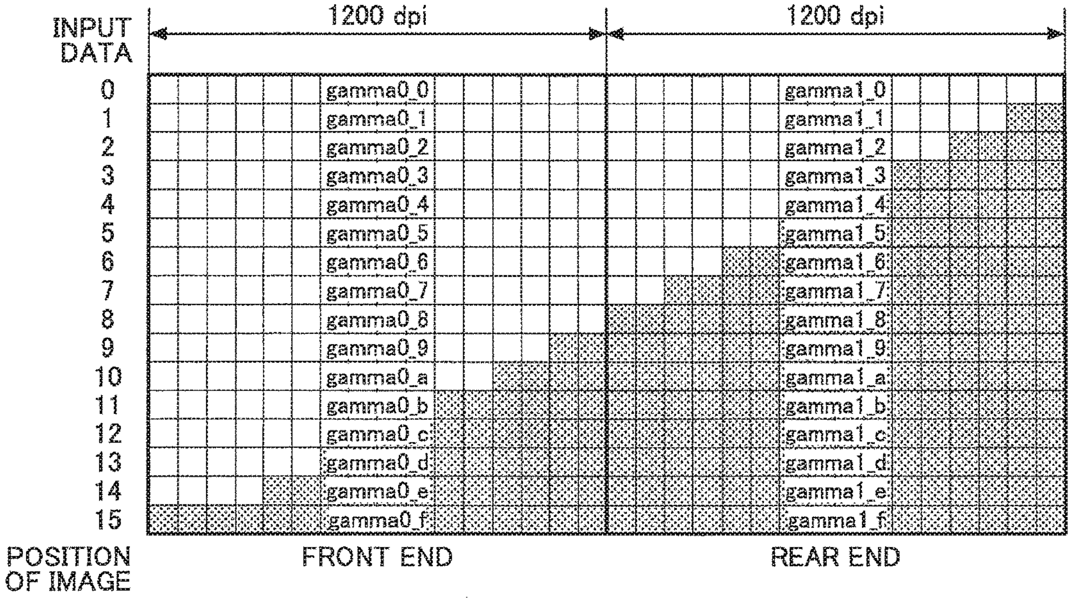
FIGS. 7A through 7C are a third set of drawings (rear-leaning) for explaining γ conversion using LUTs, according to the embodiment of the present invention.
Figure 7B:
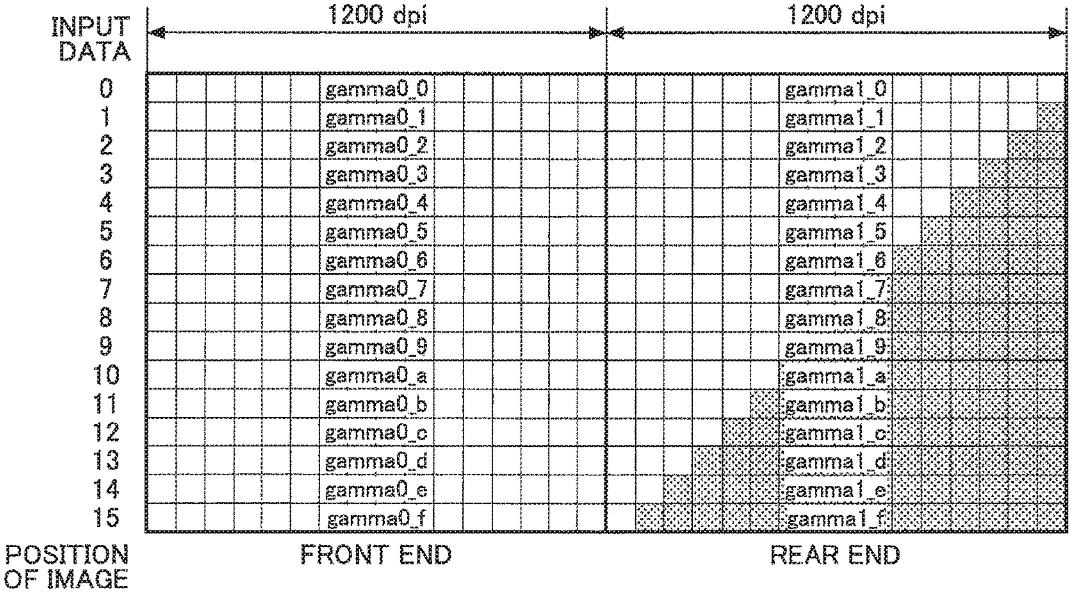
Figure 7C:
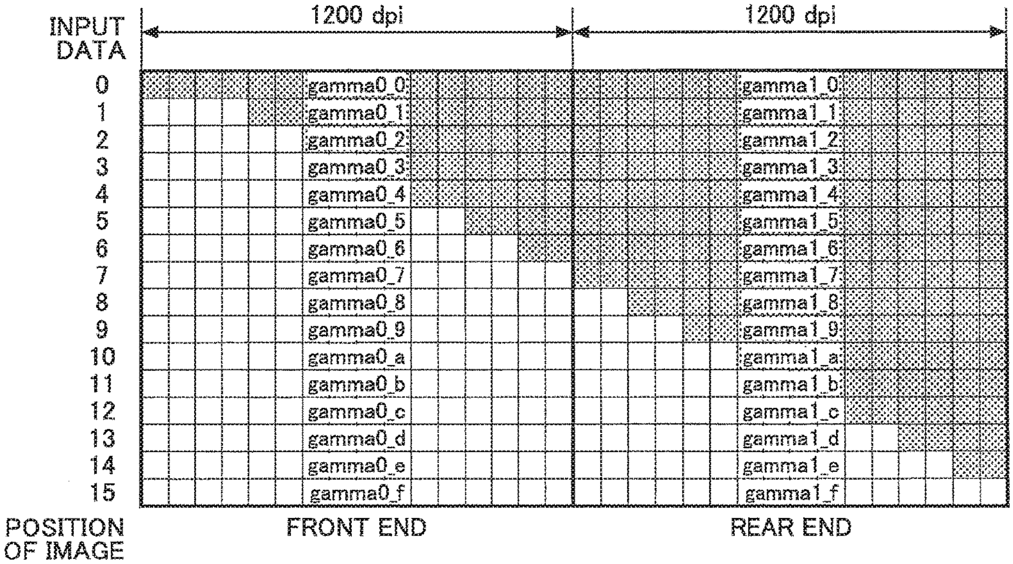

FIGS. 7A through 7C are a third set of drawings (rear-leaning) for explaining γ conversion using LUTs. According to the LUTs indicating rear-leaning light patterns illustrated in FIG. 7A, the number of lighted regions increases in order from the right end (i.e. rear end in the main-scanning direction), as the gray level becomes larger.

According to the LUTs indicating rear-leaning/light-saving light patterns illustrated in FIG. 7B, the entire regions corresponding to the duplicated pixel on the left are non-lighted regions. On the other hand, regarding the regions corresponding to the duplicated pixel on the right, the number of lighted regions increases in order from the right end, as the gray level becomes larger. Furthermore, similarly to the case as illustrated in FIG. 5B, there is an advantage in terms of toner-saving, as the number of the lighted regions is half the number of lighted regions illustrated in FIG. 7A.

According to the LUTs indicating the inverse light patterns as illustrated in FIG. 7C, the number of non-lighted regions increases in order from the left end, as the gray level becomes larger. According to the light patterns in the example of FIG. 7C, the lighted regions according to the rear-leaning light patterns illustrated in FIG. 7A are non-lighted regions and the non-lighted regions according to the rear-leaning light patterns illustrated in FIG. 7A are lighted regions. Thus, the writing data transferring system 1 may perform printing processing, where light and dark of an image data are inverted, similarly to the case in FIG. 5C.

Figure 8A:
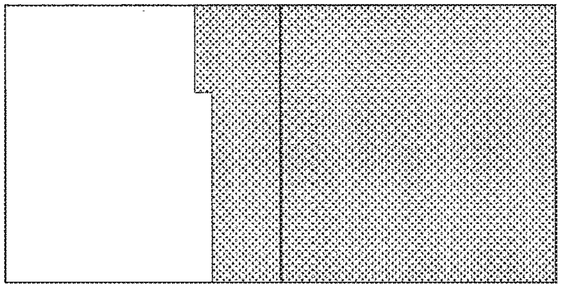
FIGS. 8A through 8E are drawings illustrating a third set of examples of lighted regions determined based on respective light patterns, according to the embodiment of the present invention.

FIGS. 8A through 8E are drawings illustrating a third set of examples of lighted regions determined based on the respective light patterns. In FIG. 8A, lighted regions according to the LUTs indicating the rear-leaning light patterns illustrated in FIG. 7A, in a case where the gray level of an input pixel is "10", are indicated. In the case where the gray level is "10", some of the regions from the right end, corresponding to the duplicated pixel on the left, are lighted, whereas the entire regions corresponding to the duplicated pixel on the right are lighted.

Figure 8B:
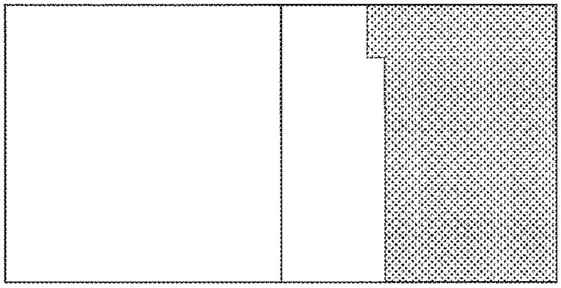

In FIG. 8B, lighted regions according to the LUTs indicating the rear-leaning/light-saving light patterns illustrated in FIG. 7B, in a case where the gray level of the input pixel is "10", are indicated. In the case where the gray level is "10", the entire regions corresponding to the duplicated pixel on the left are non-lighted, whereas more than a right half of the regions corresponding to the duplicated pixel on the right are lighted.

Figure 8C:
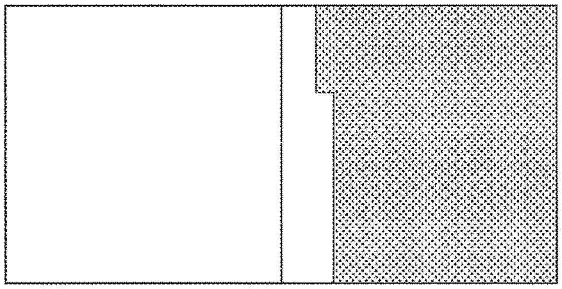

In FIG. 8C, lighted regions according to the LUTs indicating the rear-leaning/light-saving light patterns illustrated in FIG. 7B, in a case where the gray level of the input pixel is "13", are indicated. In the case where the gray level is "13", the entire regions corresponding to the duplicated pixel on the left are non-lighted, whereas most of the regions from the right end (a larger number of regions than the regions in FIG. 8B), corresponding to the duplicated pixel on the right, are lighted.

Figure 8D:
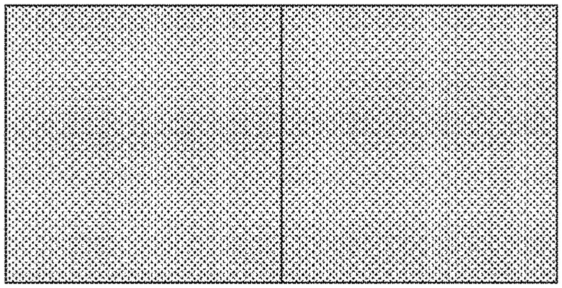

In FIG. 8D, lighted regions according to the LUTs indicating the inverse light patterns illustrated in FIG. 7C, in a case where the gray level is of the input pixel "0", are indicated. In the case where the gray level is "0", the entire regions corresponding to the duplicated pixel on the left and on the right are lighted.

Figure 8E:
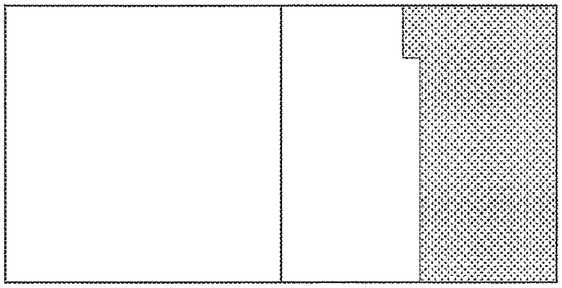

In FIG. 8E, lighted regions according to the LUTs indicating the inverse light patterns illustrated in FIG. 7C, in a case where the gray level of the input pixel is "11", are indicated. In the case where the gray level is "11", the entire regions corresponding to the duplicated pixel on the left are non-lighted, whereas an almost right half of the regions corresponding to the duplicated pixel on the right are lighted.

Figure 9A:
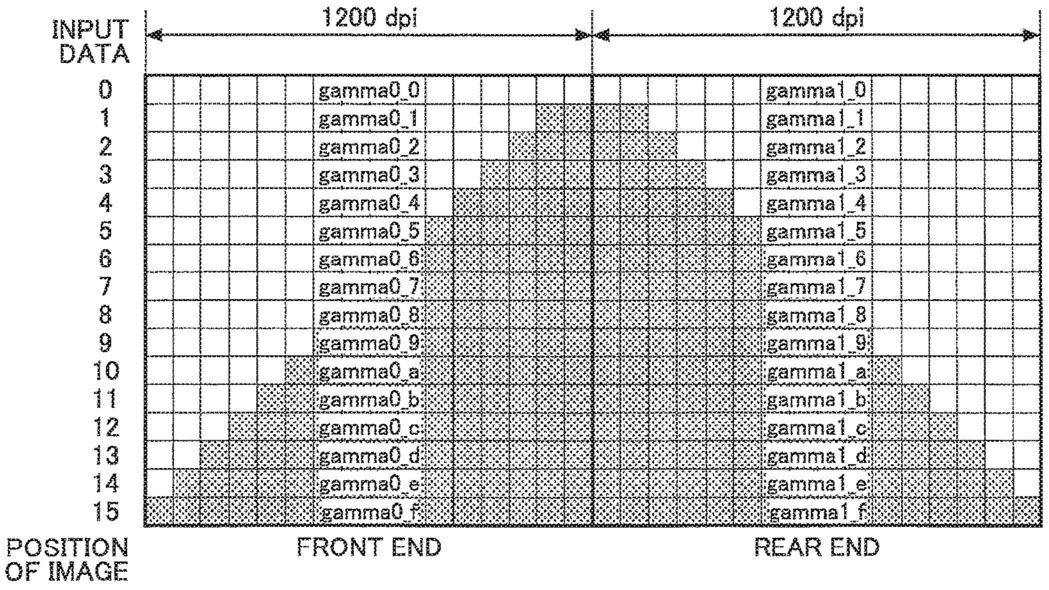
FIGS. 9A through 9C are a fourth set of drawings (center-justified) for explaining γ conversion using LUTs, according to the embodiment of the present invention.
Figure 9B:
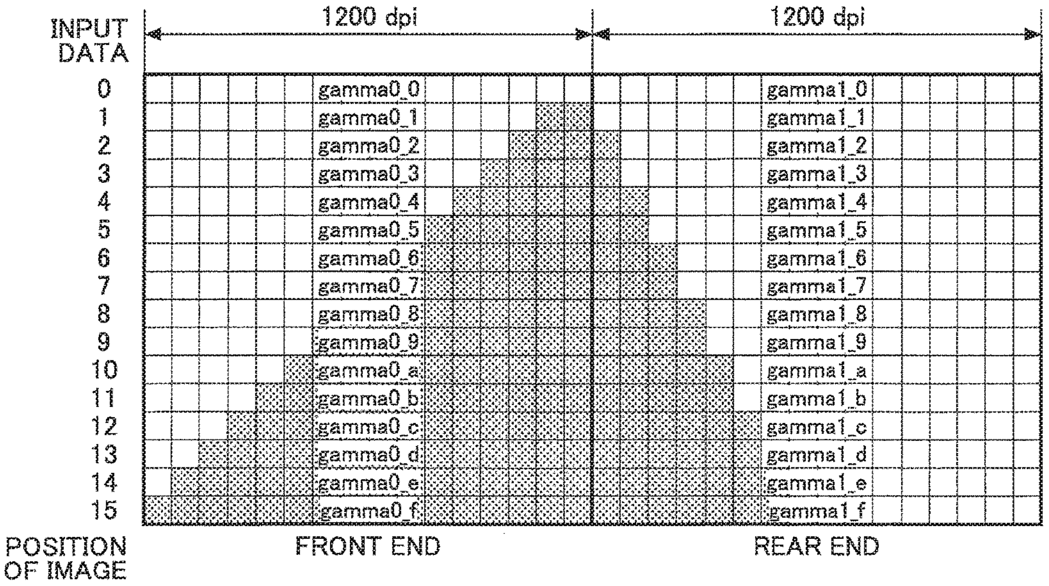
Figure 9C:
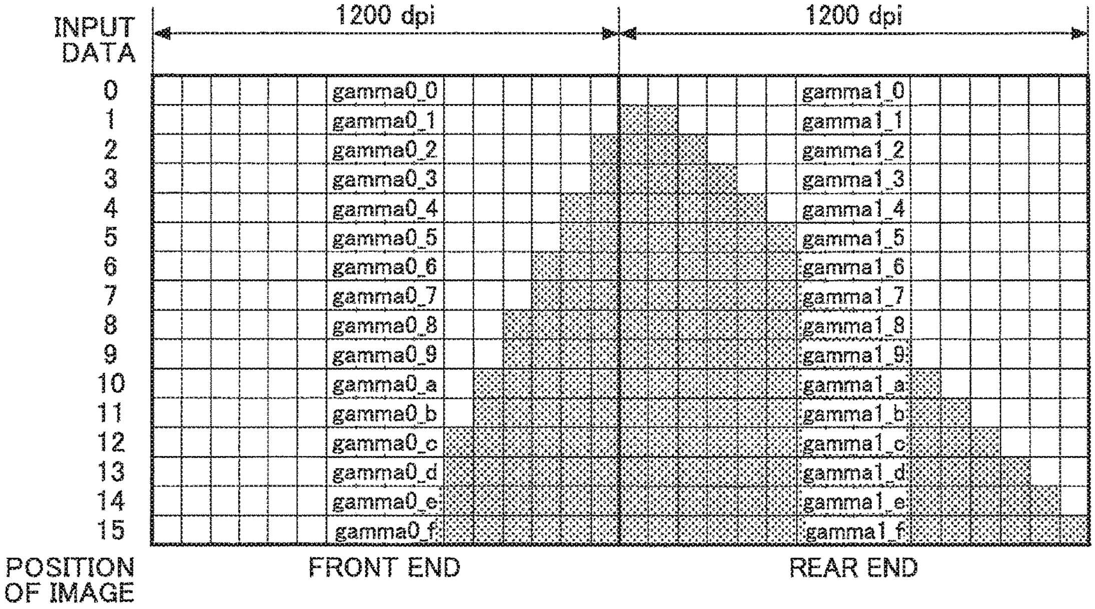

FIGS. 9A through 9C are a fourth set of drawings (center-justified) for explaining γ conversion using LUTs. According to the LUTs indicating center-justified light patterns illustrated in FIG. 9A, the number of lighted regions increases in order from the square in the middle, as the gray level becomes larger.

According to the LUTs indicating center-justified/front-leaning light patterns illustrated in FIG. 9B, the number of lighted regions corresponding to the duplicated pixel on the left increases by one square in order from the right end, per an increase of one gray level. On the other hand, the number of lighted regions corresponding to the duplicated pixel on the right increases by one square in order from the left end, per an increase of two gray levels.

In other words, an increase rate of lighted regions to an increase of the gray level, with respect to regions corresponding to a part (e.g. one pixel) of duplicated pixels, may be smaller (i.e. shift type). In such a way, an output of an image may be performed with limited brightness.

That is to say, according to the embodiment of the present invention, the tone convertor 109*a* is capable of changing an increase rate of lighted regions to an increase of the gray level with respect to each of the duplicated pixels, as an LUT applied to each of the duplicated pixels may be different.

Further, in a case of utilizing the center-justified/front-leaning light patterns, brightness of the regions corresponding to the two duplicated pixels decreases as a whole, as the number of lighted regions corresponding to the two duplicated pixels are smaller. In such a case, for example, the tone convertor 109*a* may properly adjust the number of lighted regions with respect to the regions corresponding to the pixels around the duplicate pixels and regions corresponding to whole image data. Here, the same is true with respect to center-justified/rear-leaning light patterns as described below.

According to the center-justified/rear-leaning light patterns illustrated in FIG. 9C, the number of lighted regions corresponding to the duplicated pixel on the left increases by one square in order from the right end, per an increase of two gray levels. On the other hand, the number of lighted regions corresponding to the duplicated pixel on the right increases by one square in order from the left end, per an increase of one gray level.

Figure 10A:
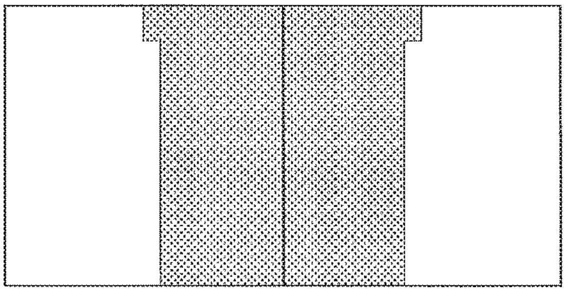
FIGS. 10A through 10E are drawings illustrating a fourth set of examples of lighted regions determined based on respective light patterns, according to the embodiment of the present invention.

FIGS. 10A through 10E are drawings illustrating a fourth set of examples of lighted regions determined based on the respective light patterns. In FIG. 10A, lighted regions according to the LUTs indicating the center-justified light patterns illustrated in FIG. 9A, in a case where the gray level of an input pixel is "6", are indicated. In the case where the gray level is "6", an almost right half of the regions corresponding to the duplicated pixel on the left are lighted, whereas an almost left half of the regions corresponding to the duplicated pixel on the right are lighted.

Figure 10B:
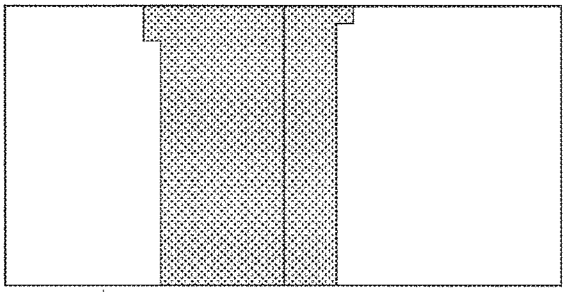

In FIG. 10B, lighted regions according to the LUTs indicating the center-justified/front-leaning light patterns illustrated in FIG. 9B, in a case where the gray level of the input pixel is "6", are indicated. In the case where the gray level is "6", an almost right half of the regions corresponding to the duplicated pixel on the left are lighted, whereas some of the regions from the left end, corresponding to the duplicated pixel on the right, are lighted.

Figure 10C:
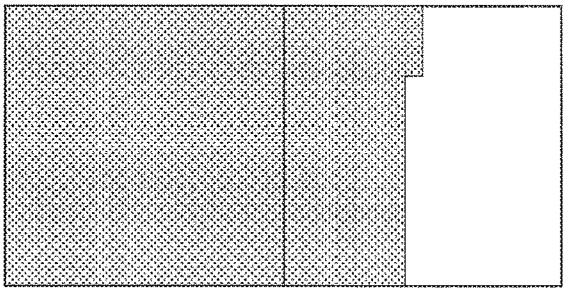

In FIG. 10C, lighted regions according to the LUTs indicating the center-justified/front-leaning light patterns illustrated in FIG. 9B, in a case where the gray level of the input pixel is "15", are indicated. In the case where the gray level is "15", the entire regions corresponding to the duplicated pixel on the left are lighted, whereas almost a left half of the regions corresponding to the duplicated pixel on the right are lighted.

Figure 10D:
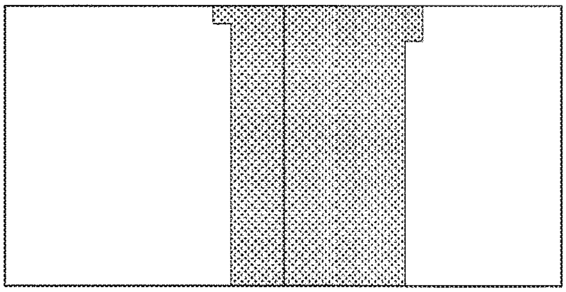

In FIG. 10D, lighted regions according to the LUTs indicating the center-justified/rear-leaning light patterns illustrated in FIG. 9C, in a case where the gray level of the input pixel is "6", are indicated. In the case where the gray level is "6", some of the regions from the right end, corresponding to the duplicated pixel on the left are lighted, whereas an almost left half of the regions corresponding to the duplicated pixel on the right are lighted.

Figure 10E:
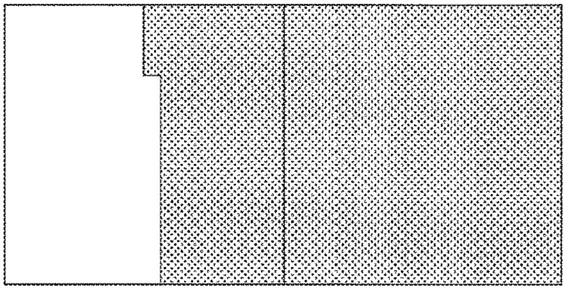

In FIG. 10E, lighted regions according to the LUTs indicating the center-justified/rear-leaning light patterns illustrated in FIG. 9C, in a case where the gray level of the input pixel is "15", are indicated. In the case where the gray level is "15", almost a right half of the regions corresponding to the duplicated pixel on the left are lighted, whereas the entire regions corresponding to the duplicated pixel on the right are lighted.

Figure 11A:
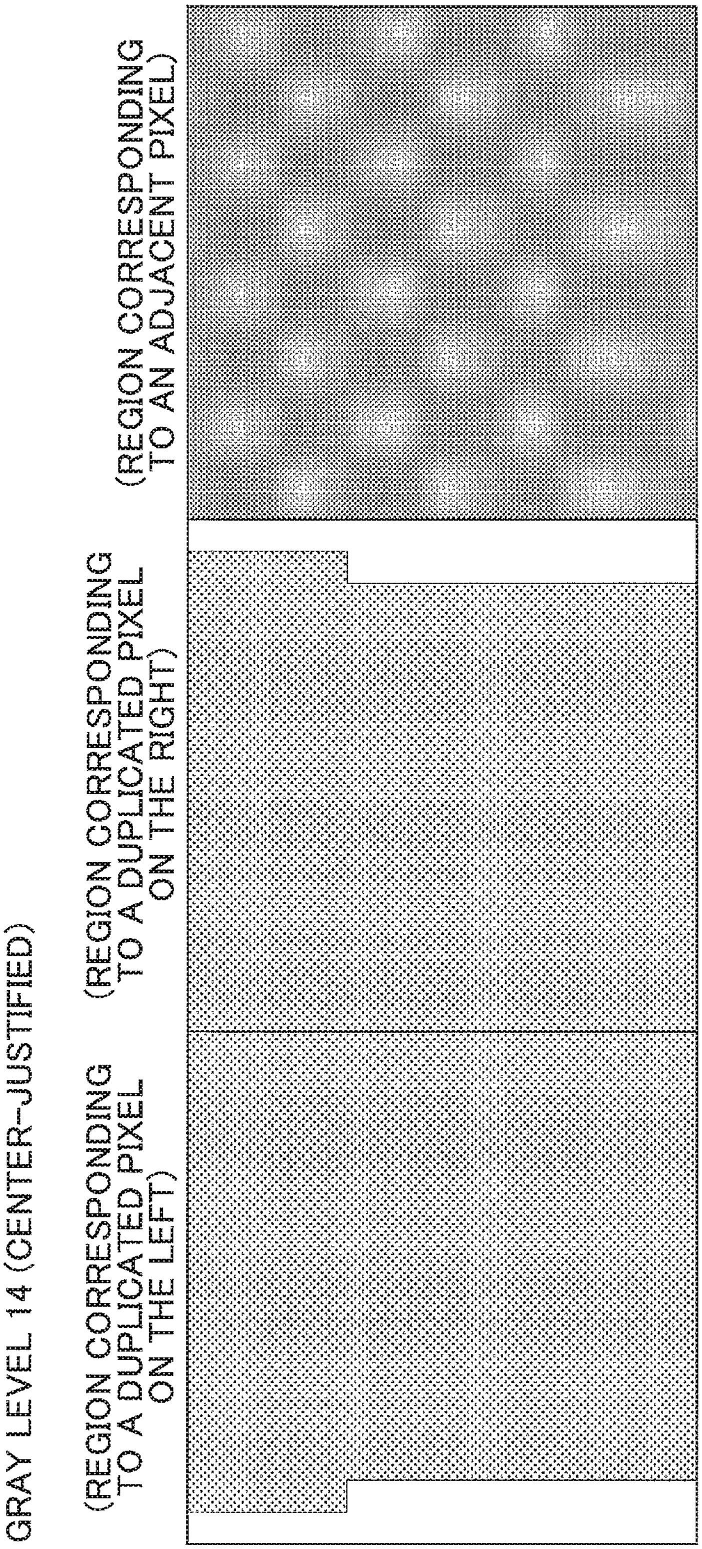
FIGS. 11A and 11B are drawings illustrating an example of tone conversion, according to the embodiment of the present invention.
Figure 11B:
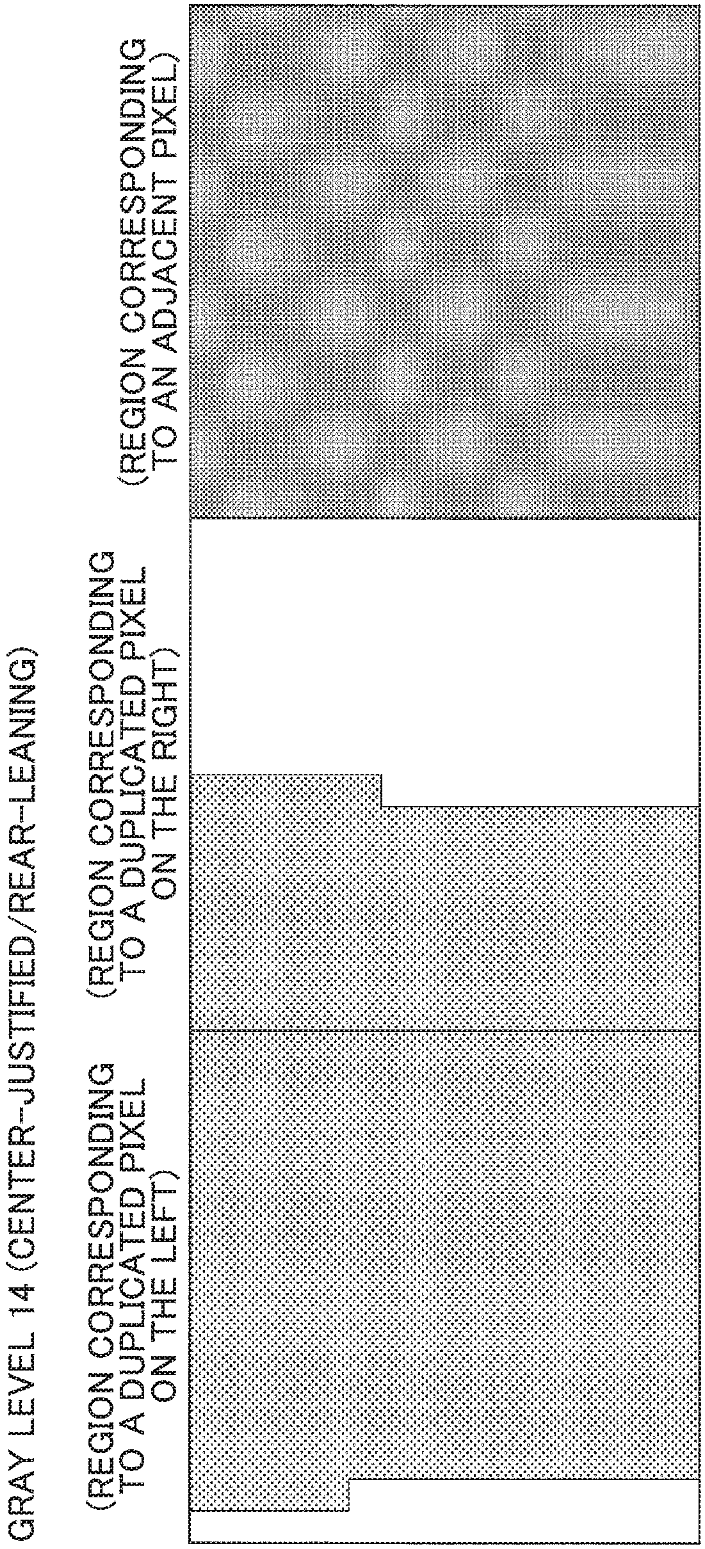

FIGS. 11A and 11B are drawings illustrating an example of tone conversion according to the first embodiment of the present invention. In FIG. 11A, lighted regions according to the center-justified light patterns, in a case where the gray level is "14", are illustrated. In a case where the entire regions corresponding to an adjacent pixel are lighted as illustrated in FIG. 11A, the width of an area formed by the non-lighted regions corresponding to the duplicated pixel on the right is narrow, being placed between lighted regions on the both sides. Therefore, accuracy of a tone expression may be deteriorated, in a case where an undesired latent image is formed due to exposure of the photoconductor on the non-lighted regions, which is caused by light from the both sides of the area formed by the non-lighted regions.

On the other hand, in FIG. 11B, lighted regions according to the center-justified/front-leaning light patterns, in a case where the gray level is "14", are illustrated. By use of the center-justified/front-leaning light patterns, the lighted regions corresponding to the duplicated pixel on the right is leaned to the left, so as to increase the width between the lighted regions. In such a way, formation of an undesired latent image due to exposure of the photoconductor on the non-lighted regions, which is caused by light from the both sides of the area formed by the non-lighted regions, may be prevented, so as to perform an accurate tone expression.

In such a way, according to the first embodiment of the present invention, positions of lighted regions may be changed separately with respect to respective duplicated pixels, as different LUTs may be applied to regions corresponding to the duplicated pixels, respectively.

Here, the tone convertors 109*b* through 109*d* perform processing similar to the processing performed by the tone convertor 109*a*, which is explained above as an example. Furthermore, the light patterns as described above are examples, and therefore other light patterns may be applied.

Furthermore, the light patterns are not limited to as described in the examples of the first embodiment of the present invention, i.e., light patterns for leaning lighted regions to the left (i.e. front-leaning light pattern), light patterns for leaning lighted regions to the right (i.e. rear-leaning light pattern), and light patterns for center justifying lighted regions (i.e. center-justified light pattern). For example, an LUT indicating light patterns for leaning lighted regions upwards and an LUT indicating light patterns for leaning lighted regions downwards may be utilized.

Furthermore, although two duplicated pixels are generated from an input pixel in the example of the first embodiment of the present invention, the number of duplicated pixels is not limited. The number of duplicated pixels generated from an input pixel may be three, and three LUTs may be applied respectively.

Second Embodiment

Selecting of an LUT will be explained. First, the tone convertor 109*a* determines arrangements of lighted regions of multiple duplicated pixels along the main-scanning direction in order. For example, the tone convertor 109*a* determines arrangements of lighted regions with regard to five duplicated pixels, respectively, in such a way as front-leaning arrangements, rear-leaning arrangements, front-leaning arrangements, center-justified arrangements, rear-leaning arrangements.

Then, the tone convertor 109*a* selects a LUT for each of the duplicated pixels so that gradation is correctly expressed, referring to the previously determined arrangements of lighted regions of some of the duplicated pixels. For example, the tone convertor 109*a* determines arrangements of lighted regions of five duplicated pixels first, and then selects a LUT for each of the duplicated pixels, referring to the arrangements of the lighted regions of the second through fourth pixel.

Gradation expression of an image printed on a print sheet may be deteriorated, in a case where a width of an area formed by non-lighted regions placed between lighted regions is narrow. Therefore, referring to previously determined arrangements of lighted regions of some of the multiple duplicated pixels, in a case where a width of an area formed by non-lighted regions placed between lighted regions is likely to be narrow, the tone convertor 109*a* may select an LUT indicating such light patterns as to increase the width between the lighted regions or an LUT indicating such light patterns as to fill up the gap between the lighted regions.

Furthermore, the tone convertor 109*a* may select an LUT indicating such light patterns as to put an isolated set of lighted regions into a chunk of lighted regions as much as possible. Specifically, in a case where the difference between the numbers of lighted regions corresponding respectively to duplicated pixels which are adjacent to each other is more than a predetermined threshold value, the tone convertor 109*a* may select an LUT indicating such light patterns so as to put a set of the smaller number of lighted regions together with a set of the larger number of lighted regions.

For example, given that the numbers of lighted regions corresponding to pixels aligned from left to right are expressed as (1, 0, 1, 10), respectively, the differences between the numbers of the lighted regions (1, 0) and (0, 1) are “1”, whereas the difference between the numbers of the lighted regions (1, 10) is “9”.

In a case where the threshold value is “8”, a value of the difference between the numbers of the lighted regions (1, 10) exceeds the threshold value. In such a case, the tone convertor 109*a* changes a light pattern (e.g. front-leaning arrangement) of the lighted region represented by “1”, to a light pattern (i.e. rear-leaning light pattern) for leaning the lighted region to the lighted regions represented by “10”.

Here, in the embodiments of the present invention, the writing data transferring system 1 is an example of an image processing apparatus. The image decompressor 30 is an example of a duplicator. Each of the tone convertors 109*a* through 109*d* is an example of a controller. The memory provided in each of the tone convertors 109*a* through 109*d* is an example of storage. The light pattern is an example of an output pattern.

Further, the present invention is not limited to these embodiments, but various variations and modifications may be made without departing from the scope scope of the present invention.

What is claimed is:

1. An image processing apparatus which reproduces an input pixel included in image data, the input pixel being expressed by use of a gray level, through a printing process performed on a plurality of segmented regions of the input pixel, based on a predetermined output pattern, the image processing apparatus comprising:

a duplicator configured to duplicate the input pixel into at least two pixels;

a storage configured to store a plurality of tables, each of the plurality of tables associating the gray level of the input pixel and an output pattern of one of the at least two duplicated pixels, such that a plurality of output patterns belonging to the respective tables exist with respect to each gray level; and a controller configured to control a plurality of output regions of the printing process, based on the output pattern corresponding to the gray level of the input pixel in accordance with a table selected for each of the duplicated pixels out of the plurality of tables, the plurality of output regions corresponding to the plurality of segmented regions of each of the duplicated pixels.

2. The image processing apparatus according to claim 1, wherein the output pattern of the plurality of tables includes a pattern for leaning the plurality of output regions towards a front edge, in a main-scanning direction, of a set of the plurality of segmented regions corresponding to the at least two duplicated pixels, a pattern for leaning the plurality of output regions towards the center, in the main-scanning direction, of the set of the plurality of segmented regions corresponding to the at least two duplicated pixels, and a pattern for leaning the plurality of output regions towards a rear edge, in the main-scanning direction, of the set of the plurality of segmented regions corresponding to the at least two duplicated pixels.

3. The image processing apparatus according to claim 1, wherein the controller controls the plurality of output regions, so that an entire set of the plurality of segmented regions corresponding to one of the at least two duplicated pixels is a non-output region, based on a table that indicates that the entire set of the plurality of segmented regions corresponding to the one of the at least two duplicated pixels is the non-output region.

4. The image processing apparatus according to claim 1, wherein the controller controls the plurality of output regions corresponding to the plurality of segmented regions of each of the duplicated pixels, based on the output pattern in accordance with a table, which is selected for each of the duplicated pixels, having a pattern for turning the the plurality of output regions into a plurality of non-output regions and turning a plurality of non-output regions into a plurality of output regions, in response to an input of a setting of image processing for inverting light and dark.

5. The image processing apparatus according to claim 1, wherein the storage stores a plurality of tables indicative of different numbers of output regions with respect to each gray level, and wherein the controller controls the plurality of output regions corresponding to the plurality of segmented regions of each of the duplicated pixels, based on the output pattern corresponding to the gray level of the input pixel in accordance with a table selected out of the plurality of tables stored in the storage.

6. The image processing apparatus according to claim 1, wherein, in a case where a difference of numbers of output regions corresponding to adjacent pixels among the at least two duplicated pixels is larger than a threshold value, the controller changes the output pattern of one of the adjacent pixels having a smaller number of output regions to an output pattern for arranging the smaller number of output regions closer to a larger number of output regions.

7. A non-transitory recording medium storing a program for causing an image processing apparatus which reproduces an input pixel included in image data, the input pixel being expressed by use of a gray level, through a printing process performed on a plurality of segmented regions of the input pixel, based on a predetermined output pattern, to execute a process, the process comprising:

duplicating the input pixel into at least two pixels;

storing a plurality of tables, each of the plurality of tables associating the gray level of the input pixel and an output pattern of one of the duplicated pixels, such that a plurality of output patterns belonging to the respective tables exist with respect to each gray level; and controlling a plurality of output regions of the printing process, based on the output pattern corresponding to the gray level of the input pixel in accordance with a table selected for each of the duplicated pixels out of the plurality of tables, the plurality of output regions corresponding to the plurality of segmented regions of each of the duplicated pixels.

8. A method performed by an information processing apparatus which reproduces an input pixel included in image data, the input pixel being expressed by use of a gray level, through a printing process performed on a plurality of segmented regions of the input pixel, based on a predetermined output pattern, the method comprising:

duplicating the input pixel into at least two pixels;

storing a plurality of tables, each of the plurality of tables associating the gray level of the input pixel and an output pattern of one of the duplicated pixels, such that a plurality of output patterns belonging to the respective tables exist with respect to each gray level; and controlling a plurality of output regions of the printing process, based on the output pattern corresponding to the gray level of the input pixel in accordance with a table selected for each of the duplicated pixels out of the plurality of tables, the plurality of output regions corresponding to the plurality of segmented regions of each of the duplicated pixels.

* * * * *